United States Patent Office 3,366,669
Patented Jan. 30, 1968

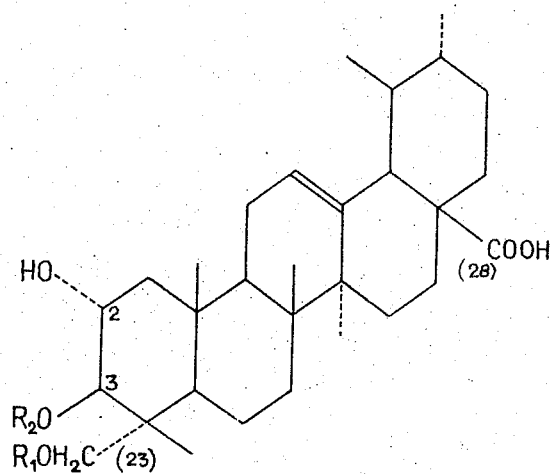

3,366,669
HEMISUCCINATES AND SALTS OF THE HEMISUCCINATES OF ASIATIC ACID
Albert Rakoto Ratsimamanga, 1 Blvd. Suchet; Marc Chanez, 84 Rue de la Chapelle; and Pierre Boiteau, 77 Rue de l'Abbe Carton, all of Paris, Seine, France
Filed Aug. 21, 1964, Ser. No. 391,101
Claims priority, application France, Aug. 28, 1963, 945,879
1 Claim. (Cl. 260—485)

The present invention relates to new derivatives of asiatic acid.

Asiatic acid or 2α,3β,23-trihydroxy-ursa-12-en-28-oic acid is a triterpenic acid having the empirical formula $C_{30}H_{48}O_5$ and the structural formula illustrated in the accompanying drawing, $R_1$ and $R_2$ being hydrogen. It exists in the natural state either in the free form in the barks and resins of Diperocarpaceae and *Centella asiatica umbelliferae* (Madagascan form) or, in the latter plant, in the form of osidic ester.

Asiatic acid has therapeutic properties, and in particular wound-healing and antiphlogistic properties. It is however insoluble in water whereas its slightly water soluble alkali salts have, when in aqueous solution, an alkali pH which is incompatible with local applications. Consequently, this limits the therapeutic applications of asiatic acid.

The object of the invention is to remedy these drawbacks.

The invention provides for this purpose new water soluble derivatives of asiatic acid, namely:

1° The hemisuccinates having the general formula illustrated in the accompanying drawing, in which one of the radicals $R_1$ or $R_2$ is hydrogen and the other is the group COOH—$CH_2$—$CH_2$—CO.

2° The alkali, alkali-earth metal and organic salts of these hemisuccinates.

3° The organic salts of asiatic acid.

The new derivatives of the invention are thus:

(a) 3-hemisuccinates and 23-hemisuccinate of asiatic acid.

(b) The alkali, alkali-earth and organic salts of the hemisuccinates, in particular those of alkylaminoalkanols and dialkylaminoalkanols.

(c) The organic salts of asiatic acid, in particular those of the alkylaminoalkanols and the dialkylaminoalkanols.

The isomeric 3- and 23-hemisuccinates having the empirical formula $C_{34}H_{52}O_8$ are distinguished by their physical and chemical properties. 3-hemisuccinate melts at 177–180° C. and has a $$[\alpha]_D^{25} = +20 \pm 0.5° \text{ (methanol)}$$

whereas 23-hemisuccinate melts at 195–197° C. and has a $$[\alpha]_D^{25} = +36 \pm 1 \text{ (methanol)}$$

At the titration according to Malaprade (Bull. Soc. Chim. France, 1928, 43, 683), 3-hemisuccinate does not consume $IO_4H$, whereas 23-hemisuccinate consumes one mole of $IO_4H$ owing to the fact that it has an α-glycol grouping.

By mild oxidation with $CrO_3$, 3-hemisuccinate yields a non-enolizable ketone; 23-hemisuccinate on the other hand yields a readily enolizable α-diketone (absorption at 272 mμ, log Σ=3.6, in U.V.) providing a reddish-purple colour with $Cl_3Fe$ in an alcoholic solution.

These reactions permit the spectrophotometric titration of 23-hemisuccinate in the mixtures of the two isomers.

3- and 23-hemisuccinates both give two categories of salts, covered by the invention: the monobasic salts in which only the free carboxyl group of succinic acid is salified and the dibasic salts in which, in addition to the aforementioned carboxyl group, the carboxyl group at position 28 of asiatic acid is salified.

As mentioned hereinbefore, 3- and 23-hemisuccinates are soluble in water, as opposed to asiatic acid.

The solubility in water of the hemisuccinates and the salts thereof and the organic salts of asiatic acid permit the preparation of aqueous solutions for local uses in therapeutics insomuch as the aqueous solutions of the salts of these hemisuccinates and of the organic salts of asiatic acid have, in the employed concentrations, pH's in the neighbourhood of neutrality. It is possible to employ in therapeutics both 3-hemisuccinate and 23-hemisuccinate, and even a mixture of both, such as is obtained by the process of preparation which will be described hereinafter and is also covered by the invention.

This process comprises reacting asiatic acid with a molar excess of succinic anhydride, separating if desired the two isomeric hemisuccinates formed and salifying them if desired.

The esterification reaction is advantageously carried out by refluxing in a solvent, such as dioxane or pyridine. Catalysts, such as $Cl_2Zn$, $SO_4H_2$ and HCl can be added to the reaction mixture. They affect the obtained proportions of the two isomers. These two isomers can be separated by chromotography.

To prepare the organic salts of asiatic acid, asiatic acid and an organic base are advantageously reacted in an organic solvent such as isopropanol. The reaction is accelerated by refluxing the reaction mixture.

The following examples illustrate the invention, it being understood that the invention is not intended to be limited thereby.

EXAMPLE 1

One mole of asiatic acid and 1.5 mole of succinic anhydride are dissolved in dioxane or pyridine with or without catalysts ($Cl_2Zn$, $SO_4H_2$, HCl). The solution is refluxed for at least two hours and then concentrated under a vacuun until dry. The dry residue is washed with water as such, or after having been extracted with alcohol, and precipitated with water. The chromatography on an alumina column permits separating the unreacted asiatic acid of the mixture of the hemisuccinates: 3-H-succinate and 23-H-hemisuccinate can be separated by chromatography. In this way there is obtained the 3-hemisuccinate, M.P. 177–180° C., $$[\alpha]_D^{25} = +20 \pm 0.5° \text{ (methanol)}$$

and the 23-hemisuccinate, M.P. 195–197° C.

$$[\alpha]_D^{25} = +36 \pm 1° \text{ (methanol)}$$

EXAMPLE 2

*Preparation of the mineral salts of the hemisuccinates*

These salts are prepared by reacting a hydroalcoholic solution of the desired hemisuccinate with a hydroxide of the metal the salt of which it is desired to form, such as sodium hydroxide.

The monosodium salts are soluble in water (4.44%), their pH is slightly acid (pH=6.3 at 0.03% concentration). The disodium salts are less soluble (0.72%) and their solution is practically neutral (pH=7.7 at 0.03% concentration).

The mono- and di-basic salts of K, Li and Ca can be prepared under the same conditions.

EXAMPLE 3

*Preparation of the organic salts of the hemisuccinates*

2 g. of 3-H-succinate of asiatic acid, 1,3 g. of hydrobromide of diethylaminoethanol bromhydrin, and 2.75 g. of potassium carbonate $K_2CO_3$ are put into 25 ml. of anhydrous dioxane. The mixture is refluxed for one hour, filtered on active charcoal, the filtrate is concentrated until dry and 100 ml. of boiling water added. This solution is filtered hot once more on active charcoal. A white precipitate is formed in the filtrate. The latter is recovered and recrystallized in water. In this hydrated crystal form the diethylaminoethanol salt of asiatic acid 3-H-succinate is only slightly soluble in water. A small amount of methanol is added thereto and the mixture is concentrated until dry under a vacuum so as to obtain a solid foam. In this form the mixture is very easily dissolved in water.

The salts of alkylaminoalkanols (such as methylaminoethanol, ethylaminoethanol) and dialkylaminoalkanols (such as dimethylaminoethanol, dipropylaminoethanol) can be obtained under the same conditions.

The salts of bromocholine can also be obtained under the same conditions.

The identity of these various bodies can be established by chromatography in thin layers on a plate of glass by comparison with reference samples.

EXAMPLE 4

*Preparation of the organic salts of asiatic acid*

20 g. of hydrochloride of 2,2'-diethylaminoethanol chlorohydrin, $[C_2H_5]^2NCH_2CH_2Cl$, HCl, are dissolved in 25 ml. of water and treated with 20 ml. of a saturated aqueous solution of $K_2CO_3$. The mixture is extracted with ether; the ether solution is dried on anhydrous $K_2CO_3$ and 25 g. of asiatic acid in 250 ml. of isopropanol are added. The mixture is heated with care to eliminate the ether, then refluxed for 3 hours. The solution is then concentrated to one half of its volume, cooled and left to crystallize. The crystals are recovered by filtration and are made to recrystallize three times in alcohol. In this way the diethylaminoethanol salt of asiatic acid is obtained, which is a water soluble salt.

The salts of the alkylaminoalkanols and the other dialkylaminoalkanols can be obtained under the same conditions.

It must be understood that the invention is not intended to be limited by the described modes of carrying out the invention, which have been given merely by way of examples.

Having now described our invention what we claim as new and desire to secure by Letters Patent is:

1. Water soluble derivatives of asiatic acid selected from the group consisting of the hemisuccinates having the following general formula:

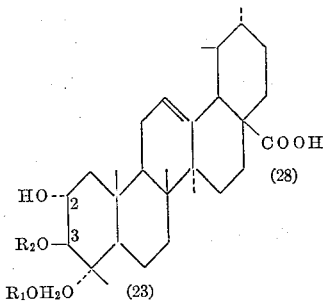

wherein one of the radicals $R_1$ and $R_2$ is hydrogen and the other is the group $COOH-CH_2-CH_2-CO-$; the alkali, alkaline-earth metal, alkylaminoalkanol, dialkylaminoalkanol and bromocholine; salts of said hemisuccinates and the alkylaminoalkanol and dialkylaminoalkanol salts and asiatic acid.

References Cited

Ratsimamanga et al., Société de Biologie (Paris) Compte Rendus de Seances, vol. 153, pp. 1989–91, 1959.

Brewis et al., J. Chem. Soc. (London), pp. 646–650, 1961.

LORRAINE A. WEINBERGER, *Primary Examiner.*

T. GALLOWAY, *Assistant Examiner.*